United States Patent [19]

Cavin

[11] 4,064,943
[45] Dec. 27, 1977

[54] PLUGGING PERMEABLE EARTH FORMATION WITH WAX

[75] Inventor: Daniel C. Cavin, Houston, Tex.

[73] Assignee: Shell Oil Company, Houston, Tex.

[22] Filed: Dec. 6, 1976

[21] Appl. No.: 748,034

[51] Int. Cl.² ...................... F21B 43/27; E21B 33/138
[52] U.S. Cl. ...................................... 166/281; 166/294
[58] Field of Search .......... 166/250, 281, 292, 294, 300

[56] References Cited

U.S. PATENT DOCUMENTS

| | | | |
|---|---|---|---|
| 3,901,316 | 8/1975 | Knapp | 166,294 X |
| 3,316,965 | 5/1967 | Watanabe | 166/294 X |
| 3,302,719 | 2/1967 | Fischer | 166/281 X |
| 3,159,976 | 12/1964 | Brandt et al | 166/294 X |
| 3,342,263 | 9/1967 | Fischer | 166/294 X |
| 3,677,343 | 7/1972 | Showalter | 166/294 X |
| 3,730,272 | 5/1973 | Richardson et al | 166/294 |
| 3,830,299 | 8/1974 | Thomeer | 166/281 X |
| 4,002,204 | 1/1977 | Cavin | 166/294 |

*Primary Examiner*—Stephen J. Novosad
*Attorney, Agent or Firm*—H. W. Coryell

[57] ABSTRACT

The permeability within a subterranean earth formation can be reduced by depositing wax within the formation near its exposed face. A self-breaking aqueous cationic emulsion of wax is injected into the formation while the emulsion composition is such that wax particles are carried into the pores of the formation and then deposited.

8 Claims, No Drawings Figures

BACKGROUND OF THE INVENTION

The invention relates to a process for decreasing the permeability of a permeable subterranean earth formation. More particularly, it relates to plugging pores located within the first few inches of the portion of an earth formation that is encountered by the borehole of a well, and provides a means for doing so in earth formations that are relatively highly permeable and/or fractured.

The positioning of a plugging material within the first few inches of an earth formation is particularly valuable for use in the injectivity profile improving process of the J. H. Thomeer Pat. No 3,830,299. In that process, the variation with depth in the fluid flow pattern of a well is determined, plugging materials are deposited within the first few inches of all permeable earth formations encountered by the well, and then at least some of the plugged portions are perforated with openings that are sized and located to provide selected rates of flow at selected depths.

Various procedures have been previously proposed for plugging subterranean earth formations. For example, the R. H. Knapp Pat. No. 3,901,316 proposes injecting a self-breaking aqueous cationic emulsion of asphalt. The R. H. Knapp and S. G. Almquist Pat. No. 3,933,204 proposes injecting an aqueous emulsion containing an epoxy-resin-forming polyepoxide polymer, an acrylic-resin-forming polycarboxy polymer, and a material for controlling the rate of their interaction, so that the emulsion deposits a resinous plug after being injected. While such previously proposed procedures are generally effective, they involve certain disadvantages. The use of an asphalt emulsion tends to plug the well borehole with a sticky deposit requiring the expense of a clean-out procedure. And, the cost of the chemicals for the polymer-containing emulsion tends to be excessive for use in treating relatively long intervals.

The prior uses of wax emulsions have been mainly confined to paper-sizing operations, furniture or floor polishes, or the like. In a colloidal suspension (or wax emulsion) the three main components are a continuous water-phase, a dispersed phase consisting of waxes and/or wax resin mixtures, and an emulsifying agent. The wax used must be selected for the type of use to be made of the emulsion. The emulsifying agent and its concentration must provide a suitable stability for the dispersion or emulsion of the waxy particles. Both the mechanical shear stability and the electrolyte stability of a wax emulsion is greatly affected by the kind and amount of all three components. Slight changes in the type or amount of any component can produce significant changes in the physical properties of the emulsion.

SUMMARY OF THE INVENTION

The present invention relates to reducing the permeability of a subterranean earth formation by depositing wax within and near an exposed face of the formation. A molten wax which has a melting point near but above the temperature of the earth formation to be treated, is mixed substantially homogeneously with an emulsifying agent that consists essentially of at least one salt of a surface active amine or quaternary ammonium compound. An oil-in-water emulsion is formed by dispersing molten wax mixture within an aqueous liquid so that substantially all of the dispersed particles have mean diameters of less than about 4 microns and the aqueous phase has a pH of less than about 4. A pH-increasing reactive material is dissolved in the aqueous liquid phase of the emulsion. The kind and the amount of the reactive material is selected so that its reaction causes the emulsion to break relatively soon after the emulsion and reactant have been subjected to the time-temperature exposure involved in flowing fluid into the earth formation to be treated. The emulsion and reactant are combined, at least substantially as soon as they enter the pores of the earth formation, and are flowed into the earth formation to be treated at a rate such that the breaking of the emulsion deposits wax within and near the exposed face of the earth formation.

DESCRIPTION OF THE INVENTION

The wax used in the present invention can be substantially any wax or wax-like substantially homogeneous mixture of wax and polymer capable of melting to form a substantially homogeneous liquid solution or dispersion at a temperature near but preferably above the temperature of the earth formation to be treated. Waxes containing free alcohols and/or acids, and naturally occurring waxes consisting mainly of hydrocarbons and alcohol esters, and wax-polymer mixtures can be used. Examples of suitable waxes include the paraffin waxes, which are available from refinery operations and which contain straight chain and/or branched isoparaffinic hydrocarbon molecules, microcrystalline waxes, which are also available from refinery operations but are recovered from residual oils which remain after the removal of the lubricating oil distillate fractions and often have higher melting points than the paraffin waxes, and various synthetic waxes and wax-polymer mixes formulated for various applications. The paraffin and microcrystalline waxes available from Shell Chemical Company under the trademarks Shell Wax SW-100, SW-200, SW-300, SM-400, SM-500, SW-700, and the like, are particularly suitable. In using the lower molecular weight paraffin waxes, concentrations of up to 10% by weight of the emulsion are generally suitable, but concentrations of about 5% or less are preferred for the higher molecular weight waxes, such as the 300, 400, 500, and 700 series of the Shell waxes. The present emulsions are particulary useful with respect to treating earth formations having termperatures from about 125 to 180° F. with waxes having melting points of from about 130 to 190° F.

In the present process, the emulsifying agent can be substantially any surface-active cationic material such as the surface-active salts of amines and quaternary ammonium compounds. Suitable surface active cationic emulsifiers are commercially available, such as: the Aerosurf AA emulsifiers from Ashland Chemical Company; the Redicote E emulsifiers from Armak Chemical Company; the Aliquat fatty quaternary ammonium chlorides; or the Diam fatty diamines from General Mills Chemical Company; the Nalquats, quaternary imidazoline bases, from Melco Chemical Company; the Arquads, alkyl trimethyl ammonium chlorides as well as the tallow amine acetates from Armak Chemical Company; the Emocols, substituted triethyl ammonium chlorides, from Emulsol Corporation, etc.

The fatty acid salts of surface active amine or quaternary ammonium compounds comprise preferred emulsifying agents. Particularly suitable members of such a class are available from the Armak Chemical Company under the trademark Armac, such as Armac-T or Armac—HT. Mixtures of such emulsifiers are particularly suitable. For example, while the Armac-HT (a hydrogenated tallow amine acetate) tends to produce somewhat more viscous emulsions that tend to have a higher sheer stability, combinations of the Armac-HT and Armac-T (a tallow amine acetate, also called the neutral acetate of octadecylamine) tend to provide less viscous emulsions of relatively high sheer stability.

The aqueous liquid used in the process in the present invention can be substantially any water that is relatively free of salts or other electrolytes. Such an aqueous liquid preferably consists essentially of water and no more than about enough acid to provide a pH of less than about 4 (preferably from about 2 to 3). Hydrochloride acid is a particularly suitable acid for use in the present invention.

Laboratory tests with the present emulsions have indicated that both monovalent and multivalent electrolyte species tend to exert de-stablizing effects on the emulsions. This was somewhat unexpected in view of the fact that, with respect to the asphalt emulsions, small amounts of calcium chloride (e.g., 0.1% by weight) tend to enhance their shear stability. In addition, with respect to various wax emulsion paper-sizing formulations, the addition of alumina tends to improve shear stability (reportedly due to the coating of the segregated wax particles with alumina in a manner preventing their coalescence when the emulsion is being subjected to high shear). But, laboratory tests of the present emulsions have indicated that such additions of alumina probably impart little or no additional shear stability.

In the present process, in preparing an oil-in-water emulsion by dispersing a molten mixture of wax and emulsifying agent in an aqueous liquid, it is desirable to use equipment capable of imparting sufficient force to cause a substantial segregation of the wax particles. Equipment such as colloid mills, homogenizers, stirred mixers, and sonic emulsifiers are particularly suitable. The agitation associated with the emulsification preferably provides a dispersion of small and relatively uniformly-sized particles, such as a dispersion of particles having mean diameters of from about 1 to 4 microns.

The pH-increasing reactant used in the present process can be substantially any water-soluble compound or mixture of compounds that react in a time and temperature controlled manner and produce a water soluble material that increases the pH of an aqueous solution. The pH-increasing reactant may compromise a water soluble cyanate, such as sodium cyanate; in which case the following reaction occurs:

$$CNO^- + 2H^+ + H_2O \rightarrow CO_2 + NH_4^+$$

A pH-increasing reactant that is particularly suitable where the temperature of the earth formation to be treated is above about 160° F. comprises a mixture of a nitrite salt and a water-soluble amide of carbonic acid, such as urea. With urea, the following reaction occurs:

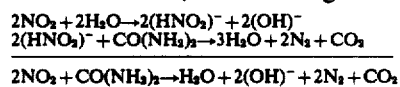

In general, the pH-increasing reactant can comprise a water soluble amide of carbamic or carbonic acid such as ammonium carbamate or urea, or their homologs, salts of cyanic acid, such alkali metal cyanates, cyanamide, etc.

As will be apparent to those skilled in the art, in designing a profile control treatment to be employed in a particular well, it is desirable to obtain as much information as possible on the oil and water production (or water injection, if the well is an injection well) history of the well to be treated. Such information should include the depth of any zone or zones having an undesirable water producing or water injection internal permeability of the formations in that interval, the average temperature within that interval, prior profile control treatments or workovers or the like which have been employed in the well. In addition the information should include petrophysical measurement data, such as that available from injection surveys, gamma ray logs, cased hole neutron logs, casing calibers, spinner surveys, and the like. If for example, such a survey indicates that the reservoir is a heavily fractured sandstone in an open-hole-completed water injection well, it may be more feasible to treat the well with a cationic asphalt-epoxy emulsion, or the like, to ensure the plugging of the fractures.

In compounding a wax emulsion for treating a particular subterranean earth formation, it is desirable to select a wax having a melting point near but above the temperature of the earth formation. Table I shows the correlation between subterranean earth formation temperatures and types of Shell waxes which are suitable for use in such formations.

TABLE I

| Applicable downhole temperatures | Shell wax type | | Concentration of wax in wax emulsion (percent by weight) |
|---|---|---|---|
| | Paraffin wax | Microcrystalline wax | |
| Less than 125° F | SW-100 | | 10 |
| 125° F.-140° F | SW-200 | SM-500 | 10 (SW-200), 5 (SM-500) |
| 140° F.-155° F | SW-300 | | 5 |
| 155° F.-175° F | | SM-400 | 5 |
| 175° F.-180° F | | SW-700[1] | 5 |

[1]SW-700 is considered here to be a microcrystalline wax type.

A particular suitable wax-compounding procedure is exemplified by the proportioning of components and sequence of steps of the following procedure, which was used for laboratory preparations of wax emulsions. For 1,000 grams of wax emulsion (2.2 lbs., basis an acid-free system), place 100 grams of Shell Wax, 100 or 200, 79 grams of Armac-HT, and one gram of Armac-T in a container. Next, melt the wax and emulsifiers together at from about 160-195° F. Layering will occur because of the density variations between the wax and emulsifiers. Therefore, *thoroughly mix*, by stirring, the wax and emulsifiers together. Place 820 grams of water in a colloid mill or heated mixer. For stability purposes, 200 mls. of 1 N HCl per every 1,000 grams of acid-free wax emulsion should be added to the water. This mixture should then be heated at from about 160°–195° F. for five minutes.

Add to the acid/water mixture the melted wax and emulsifiers while stirring vigorously in a mixer, or circulating rapidly through a colloid mill. Allow these components to mix for at least 20 minutes prior to draining off the resulting emulsion. Some agglomeration of wax may occur initially during the emulsification procedure, but continued mixing should result in a stable wax emulsion system. Be sure, however, the emulsion is free of agglomerated particles before draining the emulsion. Then slowly cool the resulting emulsion by moderate stirring for six to eight hours in a clean container. Moderate stirring while the emulsion cools reduces the tendency for wax particle agglomeration to occur during the cooling stage.

A viscosity increase will probably occur as the emulsion cools. If the viscosity becomes too great (greater than 150 cps.), gently heat the emulsion to between 100°–130° F. and stir the emulsion gently at this temperature until the emulsion is ready to be flowed into an earth formation to be treated.

If Shell Waxes 300, 400, 500 or 700 are to be used, only five percent by weight wax is recommended. Therefore, for 1,000 grams of acid free emulsion, 870 grams of water should be used instead of 820 grams. The emulsifier concentration, however, should remain the same. In all formulations, use 200 mls. of 1 N HCl per 100 gram of wax emulsion.

The following is illustrative of a particularly suitable procedure for flowing a wax emulsion into a subterranean earth formation in accordance with the present invention. Before pumping the wax emulsion into a well, the tubing should first be run into the wellbore to the top of the treatment interval. Sufficient emulsion to fill the casing below the tubing and to partially fill the tubing (usually no more than ten barrels, depending upon the depth of the treatment zone) is pumped out of the surface cooling facilities using a variable speed pump. A Moyno screw pump is ideal for this purpose.

If the volume in the casing below the tubing string is greater than five barrels, consideration may be given to placing a bridge plug below the treatment interval. However, any other attempt or attempts at in-wellbore isolation of the thief zones or treatment intervals, should be discouraged, particularly in an injection well. The wax emulsion system is designed to provide a shallow plugging which will permit a selective re-entry of particular zones.

The emulsion can now be mixed with a pH-increasing reactant, such as sodium cyanate, pumped into the well, and displaced into the surrounding earth formations (e.g., by squeezing with brine that is pumped in behind the wax emulsion). Brine that has been gelled with a conventional water-thickening agent, such as the Halliburton WG-8 polymer, provides a good displacing media. At all times, the displacement pressure should be kept less than the difference between the minimum formation fracture pressure and the sum of the surface and hydrostatic pressures on the formation face. When the displacement pressure begins to rise very rapidly, the pump-in rate should be slowed to prevent formation fracturing. If no more emulsion can be displaced into the earth formations without fracturing, the well should be shut-in and allowed to sit for at least eight to twelve hours.

The wellhead pressure should be noted periodically during the shut-in period. A gradual wellhead pressure decline with time is not unusual, but a rapid decline indicates ineffective plugging. If the wellhead pressure bleeds off to quickly, another batch of emulsion can be mixed, pumped into the wellbore, and displaced into the formation once more. The entire process is simply repeated.

However, if the wellhead pressure is maintained for a reasonable length of time (eight to twelve hours) after shut-in without a major pressure drop, effective plugging has probably occurred. At this juncture, the pressure can be bled-off, the wellbore circulated clean, and the well logged to determine the extent and effectiveness of the profile control treatment. If it was effective, all the zones in the treated interval will be plugged with wax and the desirable zones can now be re-entered, for example by perforating the plugged portions of them.

An important feature of the present cationic wax emulsions is their ability to be pumped or displaced through a slotted liner and gravel pack and into a permeable formation so that the formation is shallowly plugged with wax, resulting in a no-flow situation. This principle has been demonstrated in the laboratory.

An 0.5-inch I.D., 24-inch long, lucite cell was partially filled from one end and packed with No. 5 Clemtex sand to simulate a sandsone earth formation. Adjacent to the No. 5 Clemtex sand was packed 10½ inches of 20-40 mesh gravel to simulate a gravel pack. Finally, an 0.020-inch long slot, cut in a circular metal disc, was placed next to the 20-40 mesh gravel. This effectively wedged the simulated gravel pack between the formation sand on one side and a simulated slotted liner on the other. An initial permeability of the entire system was established by flowing brine through the system. The initial permeability was 3.06 darcies. Next, a cationic wax emulsion (SW-200 wax, prepared by the preferred laboratory procedure described above) was displaced through the slotted liner and gravel pack and into the formation sand. The driving fluid was a nitrogen gas above an oil cap to prevent gas-diffusion into the emulsion. The emulsion flowed easily through both the slotted liner and gravel pack and shallowly plugged the formation sand. A no-flow situation was provided by the treatment. The backflowing of brine through the sand pack was also prevented by the shallow wax plug.

Table II lists various properties of commercially available wax emulsions. It will be apparent that all of these emulsions showed good shear stability and all had

TABLE II

| Wax emulsion manufacturer | Wax emulsion designation | Weight percent wax | Melting point of wax (° F.) | Wax type | $d_{50}$ (microns) initial | $d_{50}$ (microns) final | Coulter counter aperture size (microns) |
|---|---|---|---|---|---|---|---|
| Petrolite Corporation, Bareco Division. | E-730/LX-532A (cationic). | 10-20 (varies) | 200 | Polyethylene (low molecular weight). | 0.9 | 4.0 | 30 |
| Petrolite Corporation, Bareco Division. | E-730/LX-364 (cationic). | 10-30 (varies) | 200 | Polyethylene (low molecular weight). | 0.78 | 2.4 | 30 | an initial mean particle diameter of approximately 1.5 microns. Measurements were made of the stability of emulsions in the presence of aqueous electrolyte solutions. For example, the column headed $d_{50}$ (microns) final lists the mean particle diameter of a sample of emulsion which had been stored for 17 hours in a container in which the sample was dispersed in a 2% brine. As indicated in the table, the brine caused a significant increase in mean particle size, indicating some particle agglomeration took place within the tested emulsions.

Table III shows the variations in wax emulsion properties with variations in the ratio of Armac-HT to Armac-T emulsifying agents. Such comparisons indicate that, with respect to a 20% by weight wax emulsion, the most consistent moderate viscosities and greatest shear stabilities were obtained by using 7.8 to 7.95% by weight Armac-HT and 0.2 to 0.05% by weight Armac-T emulsifiers. Based upon these percentages, the preferred laboratory preparation technique, described above, can be used to prepare moderate viscosity, high shear stability cationic wax emulsions.

Table IV shows the differences in wax emulsion properties resulting from emulsion preparation techniques which were substantially identical except that (a) in one case, the wax and the emulsifiers were melted together and thoroughly mixed before being added to heated mixture of acid and water, and (b) in the other case, the wax and the emulsifiers were melted but were not thoroughly mixed, prior to their dispersion in the aqueous liquid.

TABLE III

| Experiment No. | Wax type | Weight percent wax | Emulsifiers used | Weight percent emulsifiers | Weight percent water | Initial pH of emulsion | Viscosity of emulsion (cps.) | Emulsion condition* | Final emulsion stability# |
|---|---|---|---|---|---|---|---|---|---|
| 1 | SW-100 | 20 | ARMAC-HT/ARMAC-T | 4.0 /3.0 | 73.0 | 6.0 | 11 | 1 | 3 |
| 2 | SW-100 | 20 | ARMAC-HT/ARMAC-T | 5.0 /2.0 | 73.0 | 5.9 | 18 | 1 | 3 |
| 3 | SW-100 | 20 | ARMAC-HT/ARMAC-T | 6.0 /1.0 | 73.0 | 6.2 | 12 | 1 | 3 |
| 4 | SW-100 | 20 | ARMAC-HT/ARMAC-T | 6.5 / .5 | 73.0 | 6.5 | 10 | 1 | 3 |
| 5 | SW-100 | 20 | ARMAC-HT/ARMAC-T | 6.75/ .25 | 73.0 | 6.7 | 10 | 1 | 3 |
| 6 | SW-100 | 20 | ARMAC-HT/ARMAC-T | 6.95/ .05 | 73.0 | 7.1 | 75 | 2 | 3 |
| 7 | SW-100 | 20 | ARMAC-HT/ARMAC-T | 7.8 / .2 | 72.0 | 6.9 | 55 | 1 | 1 |
| 8 | SW-100 | 20 | ARMAC-HT/ARMAC-T | 7.95/ .05 | 72.0 | 6.8 | 70 | 1 | 1 |

*Emulsion condition:
 1. Thin, moderate viscosity (10–90 cps.).
 2. Creamy with possible crust on surface.
 3. Very thick (<150 cps.).

Final stability:
 1. Stable under high shear conditions.
 2. Partially stable; breaks under high shear conditions.
 3. Very unstable.

TABLE IV

| Final system design wax emulsions: B-1* | | | Original wax emulsion formulation: A-1# | | |
|---|---|---|---|---|---|
| Wax type | Weight percent wax | Initial $d_{50}$ (microns)** | Wax type | Weight percent wax | Initial $d_{50}$ (microns)** |
| SW-100 | 10 | 2.5 | SW-100 | 10 | 8.8 |
| SW-200 | 10 | 3.9 | SW-200 | | |
| SW-300 | 5 | 2.58 | SW-300 | 5 | 3.55 |
| SM-400 | 5 | 2.28 | SM-400 | 5 | 2.7 |

*A typical final wax emulsion B-1 used for system design purposes was prepared using the following formulation:
**$d_{50}$ is used to show that 50 percent of the particles have a diameter greater than or equal to the $d_{50}$ value.

| Component | Concentration or Amount |
|---|---|
| Shell Wax (SW) 100## | 10% by weight, basic acid free system. |
| Water | 82% by weight, basic acid free system. |
| Armac-HT/Armac-T | 7.9%/0.1% by weight, basis acid free system. |
| 1 N HCl | 200 ml/1000 grams total acid free wax emulsion. |

Varies to include Shell waxes 200, 300, 400, 500 and 700.

Wax and emulsifiers were melted and *thoroughly mixed* before adding to a heated mixture of the acid and water in a colloid mill or stirred mixer.
A typical "original" wax emulsion formulation A-1 was prepared using the following formulation:

| Component | Concentration or Amount |
|---|---|
| Shell Wax (SW) 100 | 10% or 20% by weight. |
| Water | 82% by weight (if 10% was used). |
| Armac-HT/Armac-T | 7.95%/0.05% by weight. |

Wax and emulsifiers were melted but *not thoroughly mixed* prior to mixing with water in a heated colloid mill.

Table V lists stability properties of emulsions of the present invention containing different grades of Shell Wax. It will be noted that, with one exception, the 17-hour storage contact with 2% brine caused substantially no indication of wax particle agglomeration. The emulsion containing the SW-100 wax showed a mean particle diameter increase from 2.5 to 7.4 microns (although no destabilization of the emulsion occurred).

TABLE V

PARTICLE SIZE ANALYSIS OF WAX EMULSIONS PREPARED WITH SHELL WAXES

| Experiment | Wax type | Weight percent wax | $d_{50}$ (microns) initial* | $d_{50}$ (microns) final# | Counter aperture size (microns) |
|---|---|---|---|---|---|
| 1 | SW-100 | 10 | 2.5 | 7.4 | 30 |
| 2A | SW-200 | 10 | 3.9 | | 100 |
| 2B | SW-200 | 10 | | 2.2 | 30 |
| 3A | SW-300 | 5 | 2.58 | | 70 |
| 3B | SW-300 | 5 | | 1.50 | 30 |
| 4A | SM-400 | 5 | 2.28 | | 70 |
| 4B | SM-400 | 5 | | 1.52 | 30 |
| 5A | SM-500 | 5 | 2.78 | | 70 |
| 5B | SM-500 | 5 | | 2.20 | 30 |
| 6A | SW-700 | 5 | 1.78 | | 70 |
| 6B | SW-700 | 5 | | 1.55 | 30 |

*$d_{50}$ is used to show that 50% of the particles have a diameter greater than or equal to the $d_{50}$ value; also called the volume mean particle diameter.
$d_{50}$ final, is the final $d_{50}$ value obtained after a sample of the emulsion was stored for 17 hours while dispersed in a 2% brine solution.

Since the present wax emulsions deposit a wax (which is selectively oil-soluble and water or acid-insoluble) within the first few inches of the exposed face of the permeable earth formations, these emulsions can advantageously be used for diverting most of an injected aqueous acid into the least permeable portions of an interval of earth formations and/or for mildly treating a permeable formation to selectively reduce its permeability to water without significantly impeding its permeability to oil. In using them as a diverting agent one or more slugs of the emulsions are alternated with one or more slugs of an aqueous acid. In selectively reducing permeability to water, relatively small or very dilute slugs of the emulsions are injected into substantially all portions of a permeable formation to an extent reducing but not completely eliminating the permeability. In either of such uses, when production is resumed, the wax plugging materials in the oil producing portions are dissolved by the oil so that, in the oil producing portions, the pretreatment permeability is substantially fully restored.

What is claimed is:
1. A process for reducing the permeability of a subterranean earth formation which is exposed to the fluid in the borehole of a well, comprising:
   mixing molten wax substantially homogeneously with an emulsifying agent consisting essentially of at least one salt of a surface active amine or quarternary ammonium compound;
   dispersing the molten wax mixture within an aqueous liquid to form an oil-in-water emulsion of relatively high shear stability by imparting sufficient agitating force to form a dispersion in which substantially all of the dispersed particles have mean diameters of less than about 4 microns and adjusting the pH of the aqueous phase to less than about 4;
   dissolving a pH-increasing reactant within the aqueous phase of the emulsion, at least substantially as soon as the emulsion flows into the earth formation to be treated, with the kind and amount of said reactant being such that its reaction causes the emulsion to break relatively soon after the emulsion and the reactant have been subjected to the time-temperature exposure involved in flowing a fluid into the earth formation; and
   flowing the reactant-containing emulsion into the earth formation at a rate such that wax is deposited within and near the exposed face of the earth formation.
2. The process of claim 1 in which the temperature of the earth formation to be treated is from about 125°-180° F. and the melting point of the wax is from about 130°-190° F.
3. The process of claim 1 in which the emulsifying agent consists essentially of at least one acetic acid salt of a tallow amine.
4. The process of claim 1 in which the melting point of the wax is from about 130°-190° F. and the melted wax at a temperature of from about 160°-190° F. is mixed with the emulsifying agent and the resulting mixture is mixed with an aqueous liquid having a pH of less than about 3 at a temperature of from about 160°-190° F.
5. The process of claim 1 in which the molten wax mixture is dispersed within the aqueous liquid to form an emulsion in which the mean diameters of the particles are from about 2-4 microns.
6. The process of claim 1 in which the pH-increasing reactant is an alkali metal cyanate.
7. The process of claim 1 in which at least one portion of said reactant-containing emulsion is flowed into the earth formation ahead of at least one portion of aqueous acid.
8. The process of claim 1 in which said reactant-containing emulsion is flowed into the earth formation in a concentration and volume such that the permeability of the most permeable portions is reduced but not completely eliminated.

* * * * *